(12) United States Patent
Kato (10) Patent No.: US 8,960,631 B2
(45) Date of Patent: Feb. 24, 2015

(54) LIQUID-SEALED ANTIVIBRATION DEVICE

(75) Inventor: Hironori Kato, Osaka (JP)

(73) Assignee: Toyo Tire & Rubber Co., Ltd., Osaka-shi (JP)

( * ) Notice: Subject to any disclaimer, the term of this patent is extended or adjusted under 35 U.S.C. 154(b) by 204 days.

(21) Appl. No.: 13/574,664

(22) PCT Filed: Jul. 15, 2010

(86) PCT No.: PCT/JP2010/004606
§ 371 (c)(1),
(2), (4) Date: Jul. 23, 2012

(87) PCT Pub. No.: WO2011/108035
PCT Pub. Date: Sep. 9, 2011

(65) Prior Publication Data
US 2012/0298831 A1 Nov. 29, 2012

(30) Foreign Application Priority Data
Mar. 5, 2010 (JP) .................. 2010-049335

(51) Int. Cl.
*F16M 13/00* (2006.01)
(52) U.S. Cl.
USPC ............ 248/560; 248/562; 248/634; 267/140
(58) Field of Classification Search
CPC .................................. F16F 13/08; F16F 13/10
USPC ....................... 267/140.13; 248/560, 634, 562
See application file for complete search history.

(56) References Cited

U.S. PATENT DOCUMENTS

| 2008/0237952 | A1* | 10/2008 | Nishi | 267/140.13 |
| 2012/0091642 | A1* | 4/2012 | Sugawara et al. | 267/140.13 |
| 2014/0097564 | A1* | 4/2014 | Satori et al. | 267/140.13 |
| 2014/0103586 | A1* | 4/2014 | Tsutsumi | 267/140.13 |

FOREIGN PATENT DOCUMENTS

| JP | 2007-078084 A | 3/2007 |
| JP | 2008-202765 A | 9/2008 |
| JP | 2008-202766 A | 9/2008 |
| JP | 2009-281431 A | 12/2009 |

OTHER PUBLICATIONS

Japanese Office Action dated Apr. 9, 2013, issued in corresponding Japanese Patent Application No. 2012-502889, w/ English translation.

(Continued)

*Primary Examiner* — Amy J Sterling
(74) *Attorney, Agent, or Firm* — Westerman, Hattori, Daniels & Adrian, LLP (57) ABSTRACT

A diaphragm 34 which defines a liquid sealing chamber 32 has a curved surface shape where the diaphragm 34 bulges toward a partition body 40 side with a center portion 34A thereof forming a peak portion, and a projection 44 which is an injection port mark of an elastic material formed at the time of forming the diaphragm 34 is formed on a film surface of the diaphragm 34 at the center portion 34A on the partition body 40 side. A recessed portion 62 which receives the projection 44 is formed in a center portion 56 of the partition body 40 which faces the projection 44 in an opposed manner, and a liquid-sealed antivibration device 10 is assembled in a state where the projection 44 of the diaphragm 34 is inserted into the recessed portion 62.

6 Claims, 4 Drawing Sheets

(56) References Cited

OTHER PUBLICATIONS

International Search Report for PCT/JP2010/004606, mailing date of Aug. 10, 2010.

Office Action dated Dec. 6, 2013, issued in corresponding Chinese application No. 201080061577.3, w/ English translation (11 pages).
Chinese Office Action dated Jun. 24, 2014, issued in corresponding Chinese Patent Application No. 201080061577.3, with English Translation (13 pages).

* cited by examiner

LIQUID-SEALED ANTIVIBRATION DEVICE

TECHNICAL FIELD

The present invention relates to a liquid-sealed antivibration device.

BACKGROUND ART

As an antivibration device such as an engine mount which supports a vibration source such as an automobile engine in a state where vibrations of the vibration source are not transmitted to a vehicle body side, there has been known a liquid-sealed antivibration device which includes a first mounting part, a second mounting part having a cylindrical shape, an antivibration base body connecting these mounting parts and is formed of a rubber-like elastic body, a diaphragm which is mounted on the second mounting part so as to form a liquid sealed chamber between the diaphragm and the antivibration base body, a partition body which partitions the liquid sealed chamber into a first liquid chamber on an antivibration base body side and a second liquid chamber on a diaphragm side, and an orifice flow passage which allows both liquid chambers to be communicated with each other. The liquid-sealed antivibration device is configured to perform a vibration damping function and a vibration insulation function due to a liquid column resonance action brought about by the liquid flow in the orifice flow passage and a vibration control effect brought about by the antivibration base body.

For example, in the following patent documents 1, 2, there is disclosed an engine mount where the above-mentioned partition body is constituted of an annular orifice forming member which is provided inside a peripheral wall portion of the second mounting part and forms an orifice flow passage, an elastic membrane which partitions the inside of the orifice forming member into a first liquid chamber and a second liquid chamber, and a pair of displacement restricting members which restricts a displacement amount of the elastic membrane from both sides of membrane surfaces of the elastic membrane.

PRIOR ART DOCUMENT

Patent Document

Patent document 1: JP-A-2008-202765
Patent document 2: JP-A-2008-202766

SUMMARY OF THE INVENTION

Problems that the Invention is to Solve

In general, in an engine mount having a low static spring constant, a displacement amount from a non-load state to an engine supporting state is large and hence, it is often the case where a dynamic spring constant is decreased by setting a free length of the diaphragm to a large value. Further, the free length of the diaphragm may be set to a large value so as to avoid the diaphragm which projects toward the outside in the axial direction from interfering with a vehicle-body side bracket when vibrations of large amplitude are inputted to the engine mount.

Figure 7:
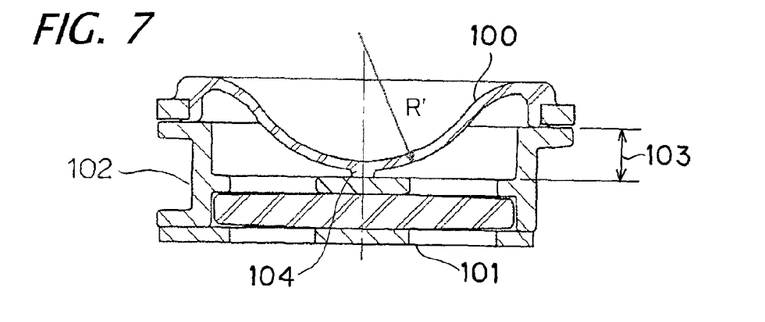
FIG. 7 is a longitudinal cross-sectional view showing the assembling structure of a diaphragm and a partition body according to a comparison example.

However, an amount of the free length of the diaphragm which can be ensured is restricted by a size of a step of the partition body. This matter is explained in conjunction with the assembled structure of a diaphragm 100 and a partition body 101 according to a comparison example shown in FIG. 7. The diaphragm 100 has a curved surface shape where the diaphragm 100 bulges toward a partition body 101 side with a center portion thereof forming a peak portion, and this bulging portion of the diaphragm 100 is housed in the inside of a step (a step between an outer peripheral portion which forms an orifice flow passage 102 and a center portion) 103 of the partition body 101. Accordingly, the more the diaphragm 100 bulges toward the partition body 101 side by decreasing a radius of curvature R' of the diaphragm 100, the larger the free length of the diaphragm 100 becomes. However, the increase in the free length of the diaphragm 100 is restricted by a size of the step 103 of the partition body 101.

Figure 10:
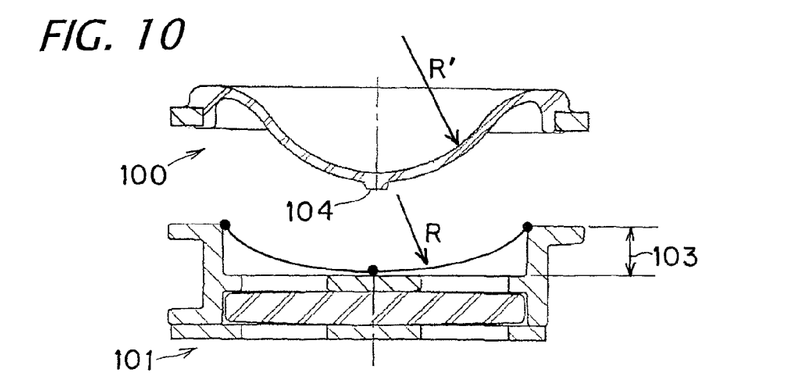
FIG. 10 is a longitudinal cross-sectional view showing the relationship between a radius of curvature of a diaphragm and a radius of curvature which is defined by a step of a partition body.

For example, when the radius of curvature R' of the diaphragm 100 is set smaller than a radius of curvature R defined by the step 103 between the outer peripheral portion and the center portion of the partition body 101 (see FIG. 10) (R'<R), a projection 104 which is positioned at the center portion of the diaphragm 100 and is an injection port mark of an elastic material interferes with the partition body 101. Accordingly, there exists a drawback that the posture of the diaphragm 100 is not stable in a state where the diaphragm 100 is assembled to the partition body 101.

Figure 8:
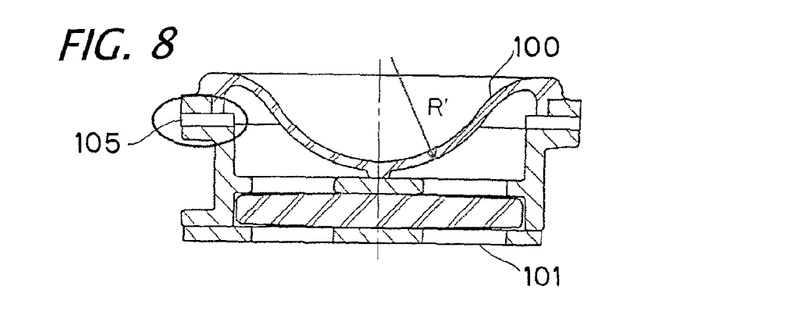
FIG. 8 is a longitudinal cross-sectional view showing the assembling structure of a diaphragm and a partition body according to another comparison example.

In view of the above, to set a large free length of the diaphragm 100 while avoiding the unstable interference between the projection 104 of the diaphragm 100 and the partition body 101, as shown in FIG. 8, it is necessary to form a gap 105 between an outer peripheral portion of the diaphragm 100 and the outer peripheral portion of the partition body 101. In this case, however, a size of the antivibration device in the axial direction of the antivibration device is increased by an amount of the gap 105 and hence, a weight of the antivibration device is increased resulting in the lowering of fuel economy due to the increase in a vehicle weight. Further, for example, when such structure is assembled into the antivibration devices disclosed in the above-mentioned patent documents 1, 2, a height of a vehicle-body-side bracket is increased by an amount corresponding to the increase in a size of the antivibration device in the axial direction thus giving rise to a drawback that strength efficiency is decreased.

Figure 9:
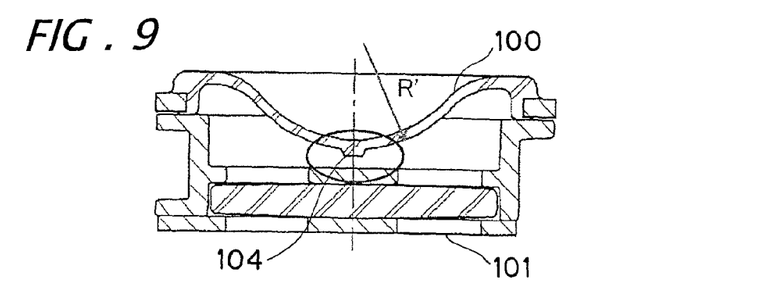
FIG. 9 is a longitudinal cross-sectional view showing the assembling structure of a diaphragm and a partition body according to still another comparison example.

On the other hand, assume a case where, as shown in FIG. 9, the free length of the diaphragm 100 is set to a small value by increasing the radius of curvature R' of the diaphragm 100 for merely avoiding the interference between the projection 104 of the diaphragm 100 and the partition body 101. In this case, a spring constant of the diaphragm 100 is increased. Accordingly, a dynamic spring constant of the antivibration device is increased so that the transmission of vibrations is increased thus giving rise to a drawback that cabin sounds and vibrations are increased. Further, since the free length of the diaphragm 100 is small, an amount of bulging of the diaphragm 100 toward the outside in the axial direction is increased when vibrations of large amplitude are inputted to the antivibration device as in the case of traveling on a rough road thus giving rise to a possibility of the interference of the diaphragm 100 with a vehicle-body side bracket. Accordingly, it is necessary to set a clearance between the diaphragm 100 and the vehicle-body side bracket above the diaphragm 100 to a large value, and this contradicts a demand for space saving.

The present invention has been made under such circumstances, and it is an object of the present invention to provide a liquid-sealed antivibration device which can decrease a dynamic spring constant by ensuring a free length of a diaphragm while realizing space saving and the reduction of weight.

Means for Solving the Problem

A liquid-sealed antivibration device according to the present invention includes: a first mounting part; a second mounting part having a cylindrical shape; an antivibration base body which connects the first mounting part and the second mounting part to each other and is made of a rubber-like elastic material; a diaphragm which is mounted on the second mounting part so as to form a liquid sealed chamber between the diaphragm and the antivibration base body and is formed of a rubber-like elastic film; a partition body which partitions the liquid sealed chamber into a first liquid chamber on an antivibration base body side and a second liquid chamber on a diaphragm side; and an orifice flow passage which allows the first liquid chamber and the second liquid chamber to be communicated with each other, wherein the diaphragm has a curved surface shape where the diaphragm bulges toward a partition body side with a center portion thereof forming a peak portion, a projection which is an injection port mark of an elastic material formed at the time of forming the diaphragm by molding is formed on a partition-body-side film surface of the center portion, a recessed portion which receives the projection is formed on a center portion of the partition body which faces the projection in an opposed manner, and the liquid-sealed antivibration device is assembled in a state where the projection of the diaphragm is inserted into the recessed portion of the partition body.

Advantages of the Invention

According to the present invention, the recessed portion which receives the projection which is formed on the center portion of the diaphragm and is the injection port mark is formed on the center portion of the partition body and hence, the unstable interference between the projection and the partition body can be avoided. Accordingly, a diaphragm having a larger free length relative to a step of the partition body can be used. That is, the free length of the diaphragm can be set to a larger value without increasing the total size of the antivibration device in the axial direction. Accordingly, the present invention can acquire space saving and the reduction of weight as well as the reduction of a dynamic spring constant by ensuring a free length of the diaphragm leading to the reduction in cabin sounds and vibrations.

MODE FOR CARRYING OUT THE INVENTION

Figure 1:
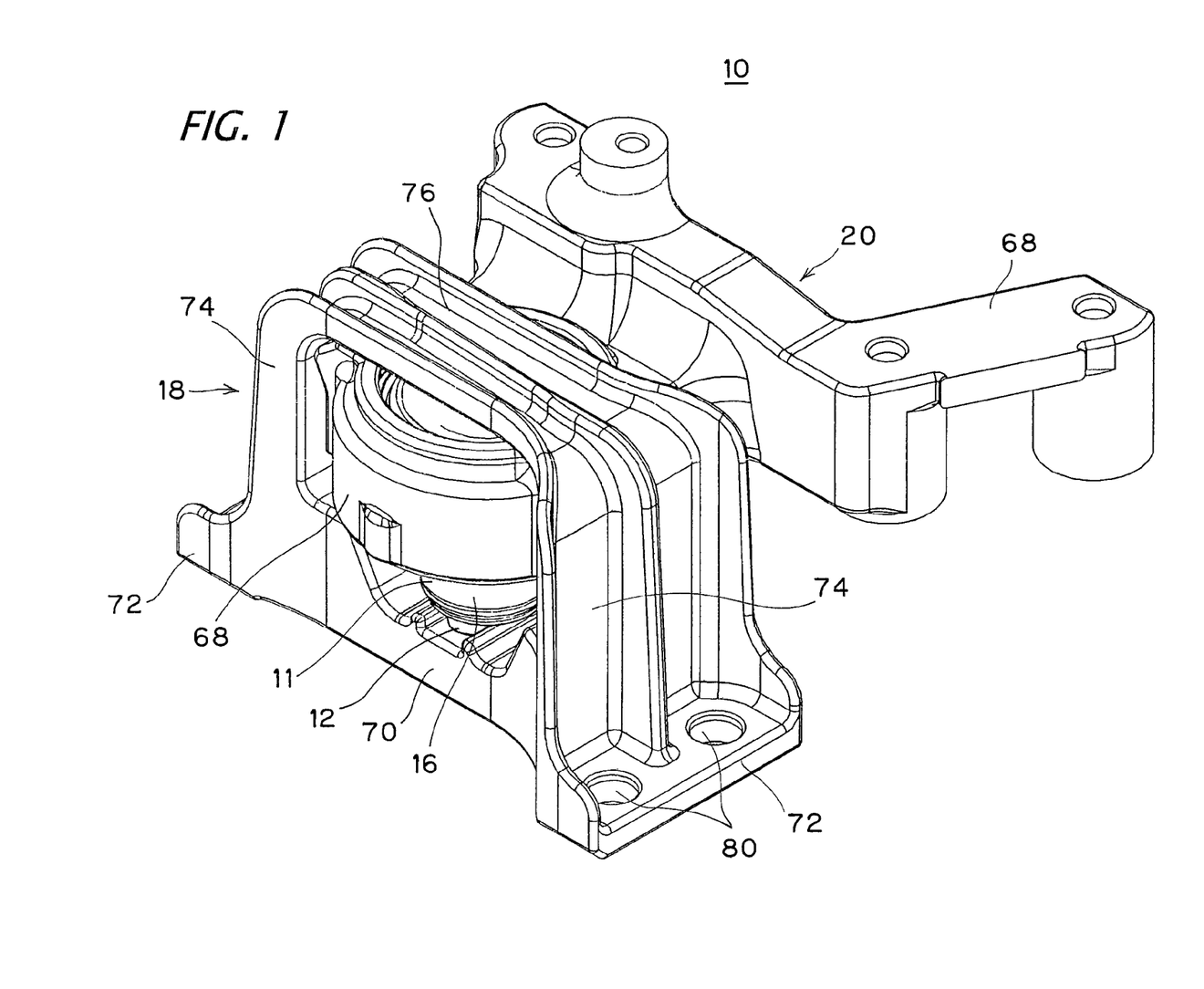
FIG. 1 is a perspective view of a liquid-sealed antivibration device according to an embodiment of the present invention.
Figure 2:
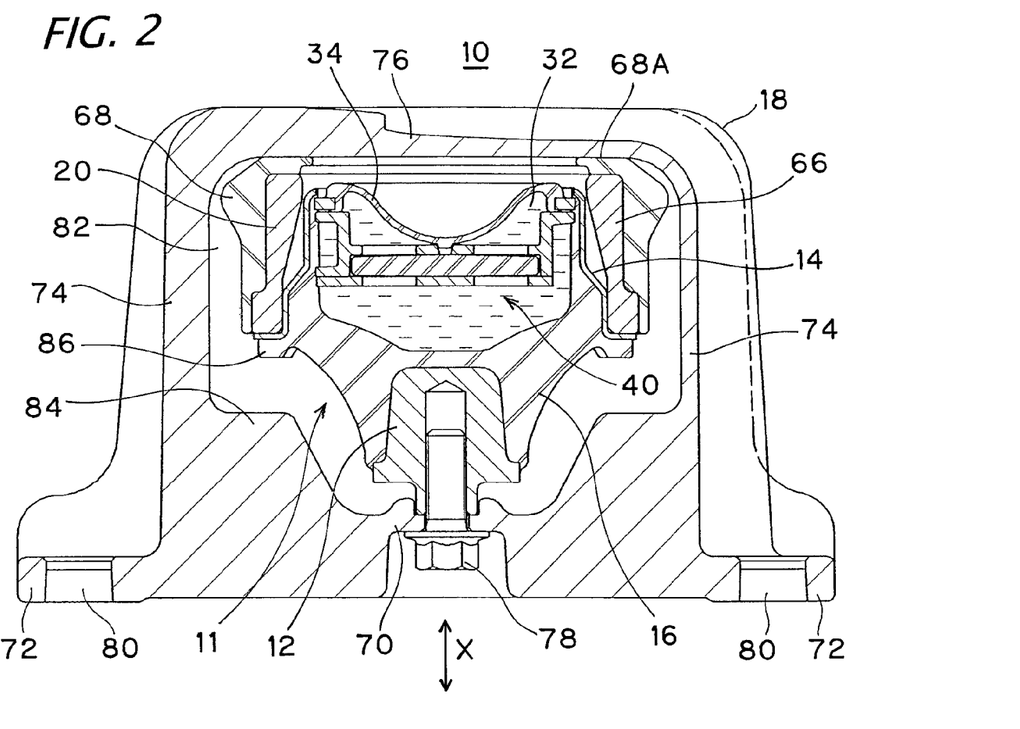
FIG. 2 is a longitudinal cross-sectional view of the liquid-sealed antivibration device.

Hereinafter, an embodiment of the present invention is explained in conjunction with drawings. A liquid-sealed antivibration device 10 according to the embodiment is an engine mount for supporting an engine of an automobile with respect to a vehicle body. As shown in FIG. 1 and FIG. 2, the antivibration device 10 includes: an antivibration device body 11 which includes a first mounting part 12 which is mounted on a vehicle body side as a lower side mounting part, a cylindrical second mounting part 14 which is mounted on an engine side as an upper side mounting part, and an antivibration base body 16 made of a rubber-like elastic body which connects these mounting parts 12, 14 to each other; a vehicle-body-side bracket 18 for mounting the first mounting part 12 on the vehicle body side; and an engine-side bracket 20 for mounting the second mounting part 14 on the engine side which constitutes a vibration source.

Figure 3:
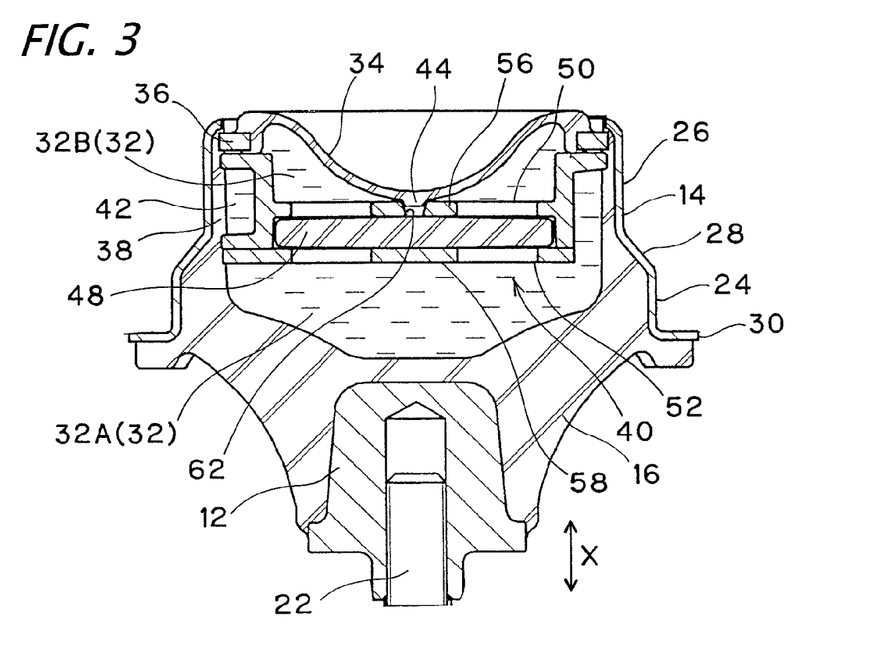
FIG. 3 is a longitudinal cross-sectional view of an antivibration device body.

As shown in FIG. 3, the first mounting part 12 is a boss fitting positioned below the second mounting part 14 along an axis of the second mounting part 14, and a female threaded portion 22 is formed in a lower end surface of the first mounting part 12 in a state where the female threaded portion 22 opens downwardly.

The second mounting part 14 is a stepped cylindrical fitting which includes a lower large-diameter cylindrical portion 24, an upper small-diameter cylindrical portion 26, and a stepped portion 28 which connects the large-diameter cylindrical portion 24 and the small-diameter cylindrical portion 26 to each other. An outwardly extending flange portion 30 which receives a lower end of a cylindrical holding portion 66 described later is formed on a lower end of the large-diameter cylindrical portion 24.

The antivibration base body 16 is adhered to an outer peripheral surface of the first mounting part 12 and an inner peripheral surface of the large-diameter cylindrical portion 24 of the second mounting part 14 by vulcanization respectively, and is formed into a generally frustoconical shape where a diameter of the antivibration base body 16 is gradually decreased in the downward direction toward the first mounting part 12 from the large-diameter cylindrical portion 24.

A diaphragm 34 which is formed of a rubber-like elastic film is mounted on an upper end portion of the second mounting part 14 such that the diaphragm 34 forms a liquid-sealed chamber 32 between the diaphragm 34 and the antivibration base body 16, and a liquid such as water, alkylene glycol or silicone oil is sealed in the liquid-sealed chamber 32. The diaphragm 34 includes a reinforcing fitting 36 on an outer peripheral portion thereof, and the reinforcing fitting 36 is mounted by fitting on an inner peripheral surface of a rubber layer 38 continuously formed with the antivibration base body 16 which is mounted on the inner peripheral surface of the second mounting part 14.

The liquid sealed chamber 32 is partitioned into a first liquid chamber 32A on an antivibration base body 16 side (that is, on a lower side) and a second liquid chamber 32B on a diaphragm 34 side (that is, on an upper side) by a partition body 40, and both liquid chambers 32A, 32B are communicated with each other through an orifice flow passage 42. The first liquid chamber 32A is a main liquid chamber where the antivibration base body 16 forms a part of a chamber wall, and the second liquid chamber 32B is a sub liquid chamber where the diaphragm 34 forms a part of a chamber wall.

Figure 4:
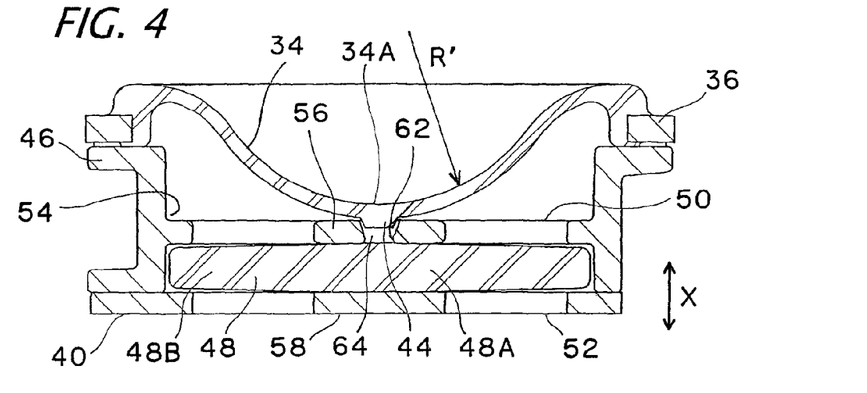
FIG. 4 is a longitudinal cross-sectional view showing the assembling structure of a diaphragm and a partition body.
Figure 5:
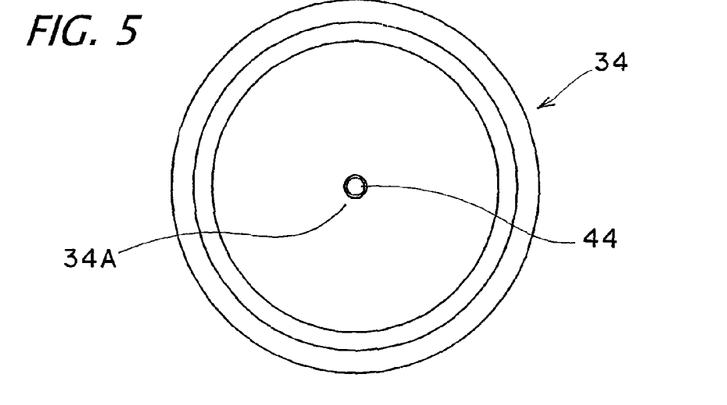
FIG. 5 is a plan view of the diaphragm.

As shown in FIG. 5, the diaphragm 34 has a circular shape as viewed in a plan view, and as shown in FIG. 4 in an enlarged manner, the diaphragm 34 has a curved surface shape where the diaphragm 34 bulges downwardly, that is, toward a partition body 40 side with a center portion 34A forming a peak portion. To be more specific, the diaphragm 34 has a partially spherical shape having a radius of curvature R' where the diaphragm 34 bulges such that the diaphragm 34 approaches the partition body 40 more closely as the diaphragm 34 extends toward the center portion 34A from an outer peripheral portion. At the center portion 34A of the diaphragm 34, a projection 44 is formed on a film surface of the diaphragm 34 on a partition body 40 side (that is, a lower surface side). The projection 44 is an injection port mark of an elastic material formed at the time of forming the diaphragm 34 by molding, has a frustoconical shape, and is formed in a downwardly raised manner from the film surface of the diaphragm 34 on the partition body 40 side.

The reason the projection 44 is formed on an outer surface (a lower surface side in the example shown in FIG. 4) of the bulging portion having a curved shape as described above is that this shape is advantageous in terms of durability compared to the case where the projection 44 is formed on an inner surface (an upper surface side in the example shown in FIG. 4) of the bulging portion. That is, by forming the projection 44 on the outer surface of the bulging portion, it is possible to allow a cross-sectional shape of a proximal portion of the projection 44 to ensure a larger radius of curvature. Further, when the diaphragm 34 is deformed by flexure, the deformation is generated in the proximal portion in the compression direction in the case of the projection 44 formed on the outer surface of the bulging portion, while the deformation is generated in the proximal portion in the tensile direction in the case of the projection 44 formed on the inner surface of the bulging portion. Accordingly, the formation of the projection 44 on the outer surface of the bulging portion is more advantageous than the formation of the projection 44 on the inner surface of the bulging portion in terms of durability. Further, when the projection 44 is formed on the outer surface, a gate of a mold for forming the diaphragm 34 can be shortened and, further, it is possible to acquire favorable operability in cutting a gate mark after forming the diaphragm 34 by molding.

The partition body 40 includes: an annular orifice forming portion 46 which is arranged inside a peripheral wall portion of the second mounting part 14 so as to form an orifice flow passage 42; an elastic membrane 48 which partitions the inside of the orifice forming portion 46 into the first liquid chamber 32A and the second liquid chamber 32B in the axial direction X; and a pair of upper and lower displacement restricting portions 50, 52 which restricts a displacement amount of the elastic membrane 48 from both sides of membrane surfaces of the elastic membrane 48. Due to the provision of the orifice forming portion 46 on an outer peripheral side and the upper displacement restricting portion 50 which constitutes a partition body portion on an inner peripheral side of the orifice forming portion 46, a recessed area 54 which is opened upwardly, that is, toward the diaphragm 34 side is formed on an inner peripheral side of the orifice forming portion 46. Further, the partition body 40 is configured such that the recessed area 54 defines a stepped portion of the partition body 40, and the bulging portion having the curved surface shape of the diaphragm 34 enters the inside of the stepped portion.

The orifice forming portion 46 is a circular annular member made of metal or a resin having a U shape in cross section which opens in the radially outward direction so as to form the orifice flow passage 42 on an outer peripheral side thereof, and is mounted by fitting on the inner peripheral surface of the rubber layer 38 of the second mounting part 14.

The elastic membrane 48 is a plate-shaped rubber member with a large wall thickness having a circular shape as viewed in a plan view. In this example, the elastic membrane 48 is formed such that a wall thickness is gradually decreased little by little in the direction from the center portion 48A to an outer periphery and hence, a wall thickness of the center portion 48A is made slightly larger than a wall thickness of a peripheral portion 48B.

Figure 6:
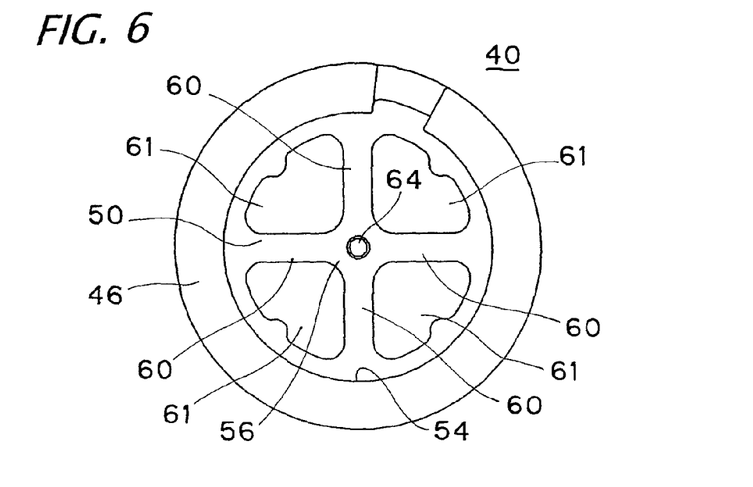
FIG. 6 is a plan view of the partition body.

The pair of upper and lower displacement restricting portions 50, 52 includes a pair of upper and lower center sandwiching portions 56, 58 which holds the elastic membrane 48 by sandwiching the center portion 48A of the elastic membrane 48 in a clamping manner, and a plurality of (four in this embodiment) grid portions 60 which extend in the radial direction from the center sandwiching portions 56, 58 (see FIG. 6). Due to such a constitution, four fan-shaped opening portions 61 are formed on the displacement restricting portions 50, 52 in the circumferential direction, and a liquid pressure in the first and second liquid chambers 32A, 32B is applied to the elastic membrane 48 through the opening portions 61. The grid portions 60 form a minute gap in the axial direction X between the membrane surface of the elastic membrane 48 and the grid portions 60 so that a displacement amount of the elastic membrane 48 which is elastically deformed by a liquid pressure can be restricted. In this example, shapes of the grid portions 60 of the pair of displacement restricting portions 50, 52 are set equal such that the grid portions 60 of the displacement restricting portion 50 and the grid portions 60 of the displacement restricting portion 52 overlap each other in the axial direction X.

Further, in this example, the displacement restricting portion 50 arranged on an upper side (a second liquid chamber 32B side) is integrally formed with the inner peripheral surface of the orifice forming portion 46 such that the displacement restricting portion 50 closes a gap defined within the inner peripheral surface of the orifice forming portion 46. On the other hand, the displacement restricting portion 52 on a lower side (a first liquid chamber 32A side) is formed as a body separated from the orifice forming portion 46, is arranged on a lower surface side of the orifice forming portion 46 in a contact manner, has a plate shape, and is mounted on the inner peripheral surface of the rubber layer 38 of the second mounting part 14 by fitting.

As shown in FIG. 4, a recessed portion 62 which receives the projection 44 is formed on a center portion of the partition body 40 which faces the projection 44 of the diaphragm 34 in an opposed manner. To be more specific, out of the above-mentioned pair of center sandwiching portions 56, 58, in the center sandwiching portion 56 on the upper side, that is, on the second liquid chamber 32B side, a through hole 64 having a circular shape as viewed in a plan view which penetrates the center sandwiching portion 56 in the axial direction X is formed (see FIG. 4 and FIG. 6). The above-mentioned recessed portion 62 into which the projection 44 is inserted is formed of this through hole 64. The recessed portion 62 has a tapered hole shape where a diameter of the recessed portion 62 is gradually increased toward the second liquid chamber 32B side so as to allow the fitting of the projection 44 having a frustoconical shape into the recessed portion 62.

As shown in FIG. 3 and FIG. 4, the antivibration device 10 is configured such that, in a state where the antivibration device body 11 is assembled, the projection 44 of the diaphragm 34 is inserted into the recessed portion 62 of the partition body 40. A height of the projection 44 is set smaller than a depth of the recessed portion 62 (that is, a plate thickness of the center sandwiching portion 56) so that the projection 44 does not interfere with the elastic membrane 48 in a state where the projection 44 is inserted into the recessed portion 62. Here, as a matter of course, the diaphragm 34 is deformed in the axial direction X by flexure when vibrations are inputted and hence, the projection 44 repeats an operation where the projection 44 is removed from and reinserted into the recessed portion 62.

The engine-side bracket 20 which holds the antivibration device body 11 having the above-mentioned constitution includes, as shown in FIG. 1 and FIG. 2, the cylindrical holding portion 66 which holds an outer periphery of the second mounting part 14, and an engine-side fixing portion 68 which extends from the cylindrical holding portion 66 and fixes the engine-side bracket 20 to an engine side. The cylindrical holding portion 66 has a short cylindrical shape coaxial with the second mounting part 14, and a cylindrical stopper rubber member 68 is mounted on an outer periphery of the cylindrical holding portion 66 in an overlapping manner.

The vehicle-body-side bracket 18 includes: a fastening surface portion 70 to which a lower end of the first mounting part 12 is fastened; a pair of vehicle-body-side fixing portions 72, 72 which is positioned on both sides of the fastening surface portion 70 in a state where the pair of vehicle-body-side fixing portions 72, 72 sandwiches the fastening surface portion 70 therebetween and is provided for fixing the vehicle-body-side bracket 18 to a vehicle body side; a pair of vertical wall portions 74, 74 which is raised upwardly from the respective vehicle-body-side fixing portions 72, 72 and is mounted on both sides of the cylindrical holding portion 66 in a state where the pair of vertical wall portions 74, 74 sandwiches the cylindrical holding portion 66 therebetween; and an upper wall portion 76 which connects upper ends of the pair of vertical wall portions 74, 74 to each other above the cylindrical holding portion 66. The vehicle-body-side bracket 18 has an approximately square shape as a whole.

The first mounting part 12 is fixed to the fastening surface portion 70 by fastening using a bolt 78. In the vehicle-body-side fixing portion 72, bolt holes 80 which penetrate the vehicle-body-side fixing portions 72 in the axial direction X are formed, and the vehicle-body-side bracket 18 is fixed to a vehicle body side by fastening by inserting bolts not shown in the drawing into the bolt holes 80. The vertical wall portions 74 are parts which perform a stopper action in the longitudinal direction of a vehicle between the vertical wall portions 74 and the cylindrical holding portion 66 which faces the vertical wall portions 74 in an opposed manner, and a predetermined stopper clearance 82 is ensured between the vertical wall portions 74 and the cylindrical holding portion 66. The upper wall portion 76 is a part which performs a stopper action for restricting the upward displacement of the cylindrical holding portion 66 relative to the upper wall portion 76 between the upper wall portion 76 and an upper end of the cylindrical holding portion 66 which faces the upper wall portion 76 in an opposed manner, and the stopper action is performed by way of an inwardly extending flange portion 68A which is formed on an upper end of the above-mentioned stopper rubber member 68.

Here, symbol 84 indicates a stopper receiving portion which performs a stopper action for restricting the downward displacement of the second mounting part 14 relative to the stopper receiving portion, and the stopper receiving portion 84 is mounted on a base portion of the vertical wall portion 74. The stopper receiving portion 84 is brought into contact with the flange portion 30 of the second mounting part 14 by way of a stopper rubber 86 which is continuously formed with the antivibration base body 16 mounted on the flange portion of the second mounting part 14 thus performing the above-mentioned stopper action.

According to the liquid-sealed antivibration device 10 having the above-mentioned constitution, when vibrations of minute amplitude are inputted to the liquid-sealed antivibration device, the difference in liquid pressure between the first liquid chamber 32A and the second liquid chamber 32B is damped by the elastic membrane 48 and hence, a dynamic spring constant can be decreased. On the other hand, when vibrations of large amplitude are inputted to the liquid-sealed antivibration device, the displacement of the elastic membrane 48 is restricted by the displacement restricting portions 50, 52 and hence, the rigidity of the elastic membrane 48 is increased as a whole whereby the damping performance exerted by the orifice flow passage 42 can be enhanced by an amount corresponding to the increase in the rigidity.

Further, in this embodiment, the radius of curvature R' of the diaphragm 34 is set smaller than the radius of curvature R (see FIG. 10) defined by the above-mentioned step of the recessed area 54 of the partition body 40 (R'<R). Even in this case, according to this embodiment, the recessed portion 62 which receives the projection 44 which is formed on the center portion 34A of the diaphragm 34 and is an injection port mark is formed on the center portion of the partition body 40 and hence, unstable interference between the projection 44 and the partition body 40 can be avoided. Accordingly, the diaphragm 34 having a larger free length relative to the above-mentioned step of the partition body 40 can be used and hence, a free length of the diaphragm 34 can be set to a larger value without increasing a size of the antivibration device body 11 in the axial direction X. Accordingly, while realizing space saving and the reduction of weight, a free length of the diaphragm 34 can be ensured so that a dynamic spring constant can be decreased thus reducing cabin sounds and vibrations.

Further, according to this embodiment, in the partition body 40 having the so-called floating membrane structure where the center portion 48A of the elastic membrane 48 is held in a sandwiched manner, the through hole 64 is formed in the center sandwiching portion 56, and the recessed portion 62 which receives the projection 44 is formed of this through hole 64. The elastic membrane 48 is held in a clamping manner at the center sandwiching portion 56 and hence, even when the through hole 64 is formed in the center sandwiching portion 56, a function of the partition body 40 is not deteriorated at all. Accordingly, the above-mentioned recessed portion 62 can be formed by a relatively simple method of forming the through hole 64 in the center sandwiching portion 56 without influencing the performance of the antivibration device 10.

Further, as described above, although a free length of the diaphragm 34 is increased, a size of the antivibration device body 11 in the axial direction is not increased and hence, it is also unnecessary to set a height of the vehicle-body-side bracket 18 to a large value whereby the deterioration of strength of the vehicle-body-side bracket 18 can be prevented.

In the above-mentioned embodiment, the explanation has been made with respect to the constitution where the elastic membrane 48 is mounted on the partition body 40. However, the present invention is not limited to a device having such an elastic membrane. For example, in a partition body which is formed of only a rigid body, a recessed portion which receives a projection may be formed on a surface of the partition body on a second liquid chamber surface side. Further, in the above-mentioned embodiment, the explanation has been made with respect to the so-called inverted liquid-sealed antivibration device where the cylindrical second mounting part is constituted of the upper mounting part connected to the vibration source side. However, the present invention is not limited to this constitution. For example, the present invention is also applicable to a liquid-sealed antivibration device where a cylindrical second mounting part is constituted of a lower mounting part connected to a vehicle body side in the same manner. Besides the above-mentioned examples, various modifications can be made without departing from the gist of the present invention although these modifications are not enumerated.

Industrial Applicability

The present invention is applicable to various antivibration devices such as a body mount, a differential gear mount, for example, besides an engine mount.

| Description of Reference Numerals and Signs | |
|---|---|
| 10: liquid-sealed antivibration device | |
| 12: first mounting part | 14: second mounting part |
| 16: antivibration base body | 18: vehicle-body-side bracket |
| 20: engine-side bracket | 32: liquid-sealed chamber |
| 32A: first liquid chamber | 32B: second liquid chamber |
| 34: diaphragm | 34A: center portion |
| 40: partition body | 42: orifice flow passage |
| 44: projection | |
| 48: elastic membrane | 48A: center portion |
| 50, 52: displacement restricting portion | |
| 56, 58: center sandwiching portion | |
| 62: recessed portion | 64: through hole |
| 66: cylindrical holding portion | |
| 70: fastening surface portion | |
| 72: vertical wall portion | 76: upper wall portion |

The invention claimed is:

1. A liquid-sealed antivibration device comprising:
a first mounting part;
a second mounting part having a generally cylindrical shape;
an antivibration base body which connects the first mounting part and the second mounting part to each other and is made of an elastic material;
a diaphragm mounted on the second mounting part so as to form a liquid sealed chamber between the diaphragm and the antivibration base body and is formed of an elastic film;
a partition body which partitions the liquid sealed chamber into a first liquid chamber on an antivibration base body side and a second liquid chamber on a diaphragm side; and
an orifice flow passage configured to allow the first liquid chamber and the second liquid chamber to be communicated with each other, wherein
the diaphragm has a curved surface shape where the diaphragm bulges toward a partition body side with a center portion thereof forming a peak portion, the diaphragm comprising a projection formed on a partition-body-side film surface of the center portion of the diaphragm, wherein the projection is an injection port mark of an elastic material formed at the time of forming the diaphragm by molding,
a recessed portion configured to receive the projection is formed on a center portion of the partition body which faces the projection in an opposed manner, wherein
said liquid-sealed antivibration device is assembled in a state where the projection of the diaphragm is inserted into the recessed portion of the partition body.

2. The liquid-sealed antivibration device according to claim 1, wherein the partition body includes: an elastic membrane which partitions the liquid sealed chamber into the first liquid chamber and the second liquid chamber; and a pair of displacement restricting portions which restricts a displacement amount of the elastic membrane from both sides of membrane surfaces of the elastic membrane, the pair of displacement restricting portions includes a pair of center sandwiching portions which holds the elastic membrane in a clamping manner at a center portion of the elastic membrane, a through hole is formed in the center sandwiching portion on a second liquid chamber side, and the recessed portion is formed of the through hole.

3. The liquid-sealed antivibration device according to claim 1, wherein the second mounting part is an upper side mounting part to be mounted on a vibration source side by way of a vibration source side bracket, and the first mounting part is a lower side mounting part which is positioned below the second mounting part and is adapted to be mounted on a vehicle body side by way of a vehicle body side bracket,
the vibration source side bracket includes a cylindrical holding portion which holds an outer periphery of the second mounting part, and
the vehicle body side bracket includes a fastening surface portion to which a lower end of the first mounting part is fastened, a pair of vehicle body side fixing portions which is positioned on both sides which sandwich the fastening surface portion therebetween so as to fix the vehicle-body-side bracket to a vehicle body side, a pair of vertical wall portions which is raised upwardly from the respective vehicle body side fixing portion and is provided on both sides which sandwich the cylindrical holding portion while ensuring a stopper clearance between the vertical wall portions and the cylindrical holding portion, and an upper wall portion which connects upper ends of the pair of vertical wall portions to each other above the cylindrical holding portion.

4. The liquid-sealed antivibration device according to claim 1, wherein the partition body includes an orifice forming portion for forming the orifice passage on an outer peripheral portion thereof, a recessed area which is opened toward the diaphragm side is formed by the orifice forming portion and a portion of the partition body on an inner peripheral side of the orifice forming portion, and a bulging portion having the curved surface shape of the diaphragm enters the recessed area.

5. The liquid-sealed antivibration device according to claim 4, wherein a radius of curvature of the diaphragm is set smaller than a radius of curvature defined by a step between the orifice forming portion of the partition body and the center portion of the partition body.

6. A liquid-sealed antivibration device, comprising:
a first mounting part;
a second mounting part having a generally cylindrical shape;
an antivibration base body which connects the first mounting part and the second mounting part to each other and is made of an elastic material;
a diaphragm mounted on the second mounting part so as to form a liquid sealed chamber between the diaphragm and the antivibration base body and is formed of an elastic film;
a partition body which partitions the liquid sealed chamber into a first liquid chamber on an antivibration base body side and a second liquid chamber on a diaphragm side; and
an orifice flow passage configured to allow the first liquid chamber and the second liquid chamber to be communicated with each other, wherein
the diaphragm has a curved surface shape where the diaphragm bulges toward a partition body side with a center portion thereof forming a peak portion, the diaphragm comprising a projection formed on a partition-body-side film surface of the center portion of the diaphragm, wherein the projection is an injection port mark of an elastic material formed at the time of forming the diaphragm by molding, a recessed portion configured to receive the projection is formed on a center portion of the partition body which faces the projection in an opposed manner, wherein said liquid-sealed antivibration device is assembled in a state where the projection of the diaphragm is inserted into the recessed portion of the partition body, and the projection is formed into a generally frustoconical shape, and the recessed portion is formed into a tapered hole shape where a diameter of the recessed portion is gradually increased toward the second liquid chamber side such that the projection is fitted into the recessed portion.

* * * * *